(12) United States Patent
Li et al.

(10) Patent No.: US 11,248,967 B2
(45) Date of Patent: Feb. 15, 2022

(54) DUAL-USE STRAIN SENSOR TO DETECT ENVIRONMENTAL INFORMATION

(71) Applicant: New Degree Technology, LLC, Baltimore, MD (US)

(72) Inventors: Hao Li, Chandler, AZ (US); Zhiyun Chen, Olney, MD (US)

(73) Assignee: New Degree Technology, LLC, Baltimore, MD (US)

(*) Notice: Subject to any disclaimer, the term of this patent is extended or adjusted under 35 U.S.C. 154(b) by 68 days.

(21) Appl. No.: 16/627,917

(22) PCT Filed: Jun. 12, 2018

(86) PCT No.: PCT/US2018/037079
§ 371 (c)(1),
(2) Date: Dec. 31, 2019

(87) PCT Pub. No.: WO2018/231808
PCT Pub. Date: Dec. 20, 2018

(65) Prior Publication Data
US 2020/0225099 A1    Jul. 16, 2020

Related U.S. Application Data

(60) Provisional application No. 62/518,997, filed on Jun. 13, 2017.

(51) Int. Cl.
*G01L 1/18* (2006.01)
*G01K 7/16* (2006.01)
*G06F 3/041* (2006.01)
*G01B 7/16* (2006.01)
*H01B 1/20* (2006.01)

(52) U.S. Cl.
CPC .............. *G01K 7/16* (2013.01); *G01B 7/18* (2013.01); *G01L 1/18* (2013.01); *G06F 3/0416* (2013.01); *G06F 3/04144* (2019.05); *H01B 1/20* (2013.01); *G06F 3/0414* (2013.01)

(58) Field of Classification Search
None
See application file for complete search history.

(56) References Cited

U.S. PATENT DOCUMENTS

| 3,034,345 A | 5/1962 | Mason |
| 2013/0082970 A1 | 4/2013 | Frey et al. |
| 2016/0048266 A1 | 2/2016 | Smith et al. |
| 2018/0018055 A1 | 1/2018 | Li |

FOREIGN PATENT DOCUMENTS

WO    2011/067734 A1    6/2011

OTHER PUBLICATIONS

International Search Report and Written Opinion for corresponding PCT/US2018/037079, dated Aug. 30, 2018, 13 pages.

*Primary Examiner* — Lisa M Caputo
*Assistant Examiner* — Nigel H Plumb
(74) *Attorney, Agent, or Firm* — Nixon & Vanderhye P.C.

(57) ABSTRACT

By combining at least two strain sensors in a symmetric configuration, a dual use sensor may be realized. This may reduce the footprint, cost, and complexity of employing two different sensors. It may also improve the accuracy of the measurements as two different parameters i.e., strain and environmental information are measured at the same physical location. This dual use sensor may be deployed in an array over a large area or space, providing systemic information of the subject that is previously difficult to detect.

20 Claims, 6 Drawing Sheets

DUAL-USE STRAIN SENSOR TO DETECT ENVIRONMENTAL INFORMATION

CROSS-REFERENCE TO RELATED APPLICATIONS

This application is related to U.S. Provisional Patent Application No. 62/361,133 filed Jul. 12, 2016; U.S. Provisional Patent Application No. 62/365,055 filed Jul. 21, 2016; U.S. Provisional Patent Application No. 62/367,180 filed Jul. 27, 2016; U.S. Provisional Patent Application No. 62/457,674 filed Feb. 10, 2017; and U.S. Provisional Patent Application No. 62/517,038 filed Jun. 8, 2017. These prior applications are incorporated herein in their entirety by reference. This application claims priority to U.S. Provisional Patent Application No. 62/518,997 filed Jun. 13, 2017.

STATEMENT REGARDING FEDERALLY SPONSORED RESEARCH OR DEVELOPMENT

Not applicable.

FIELD

This technology relates to a dual use strain sensor, and more particularly to a strain sensor that can also be used to sense other environmental information, such as temperature or humidity, and sensing apparatus made thereof, for a variety of applications.

BACKGROUND AND SUMMARY

Strain sensors are widely used in a broad array of applications where local strain or strain change, pressure or pressure change; displacement, deformation, bending, or flexing, need to be measured.

BRIEF DESCRIPTION OF THE DRAWINGS

The example non-limiting embodiments herein will be better and more completely understood by referring to the following detailed description in conjunction with the drawings, of which.

DETAILED DESCRIPTION OF PRESENTLY PREFERRED EXAMPLE ILLUSTRATIVE NON-LIMITING EMBODIMENTS

In many applications where strain sensors are used, the temperature, or other environmental information, such as humidity, air pressure, etc., also need to be detected. It is therefore highly desirable that the strain sensor can also be used to detect other environmental information. This will significantly reduce the footprints of sensors and reduce the complexity of the overall system. Another advantage is that such a device will enable the measurement of a pair of information at the exact same physical location, greatly enhancing the accuracy of the information.

One non-limiting example is that when used as force touch sensors for smartphones and tablets, it is preferable to detect temperature change along with the applied force. The detection of temperature change together with the applied force may avoid false trigger as the finger press typically is associated with a temperature change as well. It may also be employed to distinguish the force applied by a finger, or an inanimate object such as a stylus.

Another non-limiting example is that when used as tactile sensors for robotics, the detection of temperature change or humidity change along with applied force may provide information on the type of objects it is touching.

The field of use for such a dual use strain sensor includes but is not limited to any human machine interface for smart phones, tablets, personal computers, touch screens, virtual reality (VR) systems, gaming systems, consumer electronics, vehicles, scientific instruments, toys, remote controls, industrial machinery and flow controls, bio-medical sensors to monitor heart rate, blood pressure, and the movements and acceleration of muscles, bones, joints and other body parts; robotic sensors to measure touch, local pressure, local tension, movements and acceleration of any parts of the robots; vibration sensors for buildings, bridges and any other man-made structures; sensors to monitor strain, pressure, movement, acceleration of any parts of vehicles that may be used in land, air, water, or space; movement, acceleration, and strain sensors that can be incorporated into smart fabrics; movement, acceleration, and strain sensors that can be incorporated into microelectromechanical (MEMS) systems, and any other applications where local static or dynamic deformation, displacement, or strain that may need to be measured simultaneously with temperature, temperature change, humidity, or humidity change.

Piezo-Resistive Strain Sensor

Figure 1A:
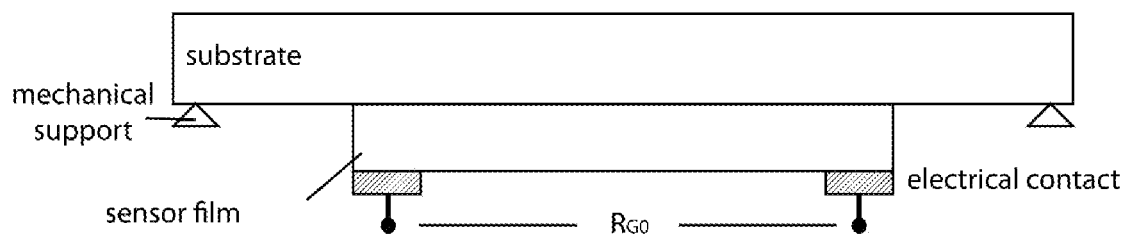
FIG. 1a shows an exemplary strain sensing film comprising a piezo-resistive material deposited on a substrate to form a variable resistor. Electrical contacts are made to measure the resistance of $R_{G0}$. The figure is not drawn to the real proportion for illustrative purposes (the thickness of the substrate is typically much thicker than the strain sensing film so that the film lies on one side of the neutral plane and only experience either compressive or tensile strain). Two mechanical supports are shown for the convenience of demonstration. Any other designs of the supporting structure may be used as long as the structure can convert the applied force to a local strain with consistency.
Figure 1B:
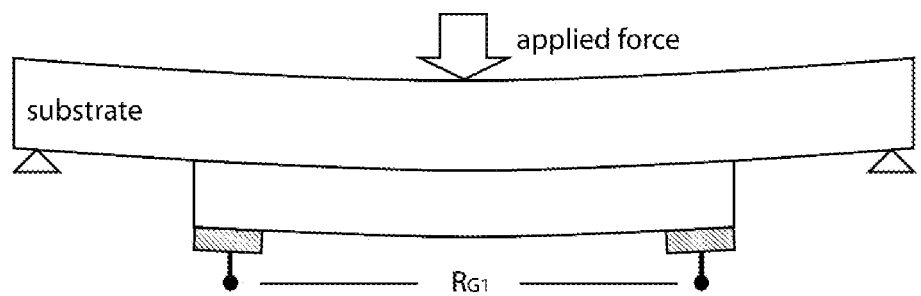
FIG. 1b shows an exemplary strain sensing film comprising a piezo-resistive material deposited on a substrate under an applied force and the resistance of the structure now changes to $R_{G1}$. The actual thickness of the substrate may be much thicker than the thickness of the film and in this particular case the film is experiencing tensile strain.
Figure 2:
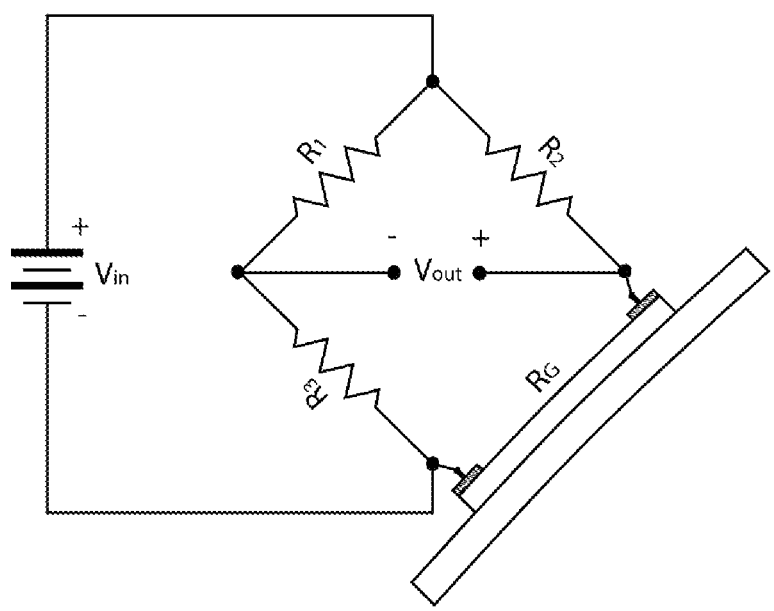
FIG. 2 shows an exemplary Wheatstone bridge where one arm of the bridge is replaced by the variable resistor comprising presently disclosed piezo-resistive material. $R_1$, $R_2$, $R_3$ are reference resistors and the change of the variable resistance can be calculated from $R_1$, $R_2$, $R_3$, $V_{in}$, and $V_{out}$, hence the stain and force applied to the strain sensing film.
Figure 3:
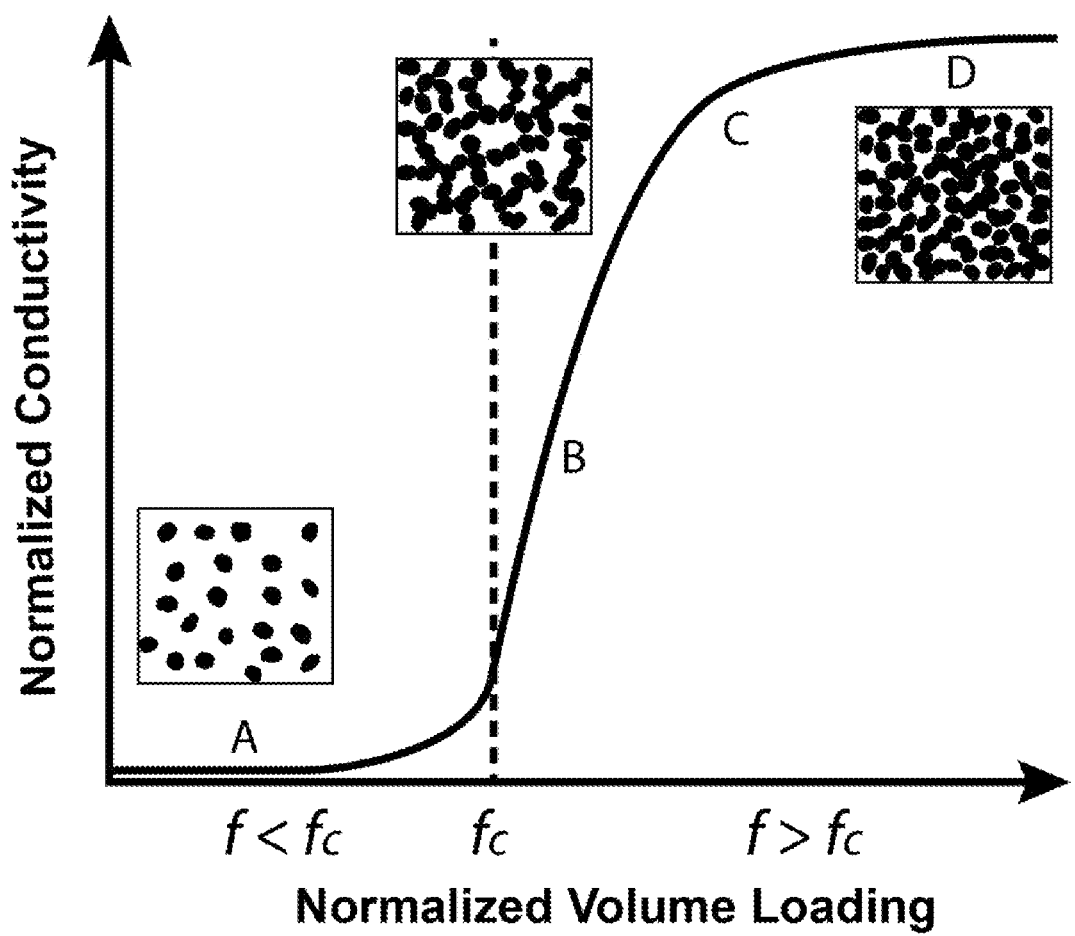
FIG. 3 shows an exemplary normalized conductivity as a function of volume loading of a conductive filler in an insulating matrix. The insets are exemplary illustrations of the conductive filler configurations below, near, and above percolation threshold.

One of the major type of force sensor is based on piezo-resistive strain gauge or its variations. When a piezo-resistive material is used in a strain gauge, the conductivity, or resistivity, changes when the material is under stress. In one common form of such a strain gauge, a thin strip of the piezo-resistive material is deposited, or attached, or bonded, onto a substrate to form a variable resistor, as shown in FIG. 1a. Any deformation of the substrate, as shown in FIG. 1b, will induce a change of resistance in the variable resistor and by measuring the change of resistance, i.e. using a Wheatstone bridge structure shown in FIG. 2, the local strain, or applied force, can be deduced. The ratio of the resistance change to the local mechanical strain is defined as Gauge Factor (GF), which can be expressed as:

$$GF = \frac{\frac{\Delta R}{R}}{\epsilon} = \frac{\frac{\Delta \rho}{\rho}}{\epsilon} + 1 + 2v \qquad \text{Eq. 1}$$

where $\epsilon$ represents the mechanical strain; R, $\Delta R$, $\rho$, $\Delta \rho$ represent resistance, change in resistance, resistivity, and change in resistivity respectively, and v is Poisson's Ratio, which is an intrinsic material property defined as the ratio between transverse strain ($e_t$) and longitudinal strain ($e_l$) in the elastic loading direction. For an isotropic, elastic, and homogeneous material, $-1 \leq v \leq 0.5$. Material with $v=0.5$ is an incompressible material, i.e., the volume of the material does not change under mechanical strain.

It should to be noted that such a resistive strain gauge does not require a piezo-resistive material to operate. In the present disclosure, a piezo-resistive material is defined as having a substantial change in resistivity when a mechanical strain is present. Although almost all materials exhibit a certain degree of piezo-resistivity. For many, the effect is too small to be useful for any practical purposes and can be regarded as non-piezo-resistive. Even for a non-piezo-resistive material, i.e. $\Delta \rho = 0$, the Gauge Factor is still non-zero as the resistance still changes due to geometric change of the variable resistor under strain, given that its Poisson's Ratio of the constituent material does not equal to 0.5. In another words, the piezo-resistive effect can still be observed using a non-piezo-resistive material. This is essentially the operating mechanism of metallic wire and foil strain gauges where a metal is used as the material to form the resistor. For resistive strain sensor with non-piezo-resistive material, however, the theoretical upper limit of the Gauge Factor is approximately 3 and this severely limits their usefulness in many applications.

By introducing piezo-resistive material, the sensitivity of a strain gauge can be increased significantly. For example, semiconductors, such as silicon or germanium, which can have a gauge factor well above 100. The gauge factor in these materials in fact is dominated by $\Delta \rho / \rho$.

The semiconductor based piezo-resistive materials, although superior in performance, requires high temperature and complex manufacturing process, and they are also brittle and fragile. They are usually available as stand alone, discrete devices with relatively high unit cost. They are difficult to be built onto flexible plastic substrates, into large array, into a variety of non-planar form factors; and placed accurately.

Composite, especially nanocomposite materials with semi-conductive or conductive fillers and polymeric binders, can be processed similar to a polymer. They can be solution processed near room temperature, can be printed and patterned using mature film forming and printing techniques such spin-coating, spray coating, screen printing, dip-coating, slot-die printing, ink jet printing, etc. They are much more compatible with consumer electronic industry where high sensitivity, compatibility with flexible and plastic substrates, compatibility with volume production, flexibility in design and form factors, accuracy of placement, and low cost are important.

Most nanocomposite piezo-resistive materials comprise conductive or semi-conductive fillers, such as metals or alloys, conductive metal oxides, or various forms of carbons, in a polymer matrix. The filler size is usually in a few nanometers to a few nanometers range to ensure high dispersability of the fillers, i.e. processable viscosity property, sufficient stability, and good homogeneity.

Another advantage of nanocomposite is that the resistivity, GF, and thermal coefficient of resistance (TCR), can be tuned to different values by modifying the type of conductive filler, the size and shape of the conductive filler, the loading level of the conductive filler, and the type of polymer matrix, and other ingredients of the nanocomposite. As an illustrative, nonlimiting example, FIG. 1 demonstrates this tunability by plotting a generic trend of the normalized conductivity vs. conductive filler volume loading in an insulating matrix near percolation threshold. Since a lot of external factors, such as mechanical stress, temperature change, moisture or other chemical species absorption, air pressure change, may lead to volume change, hence the volume loading change, of the material, the conductivity may change accordingly. The rate of such a change may be tuned by tuning the initial volume loading of the conductive filler, as shown in FIG. 1. This tunability opens up the possibility of designing material that can detect a specific pair of parameters for different target applications.

Figure 4A:
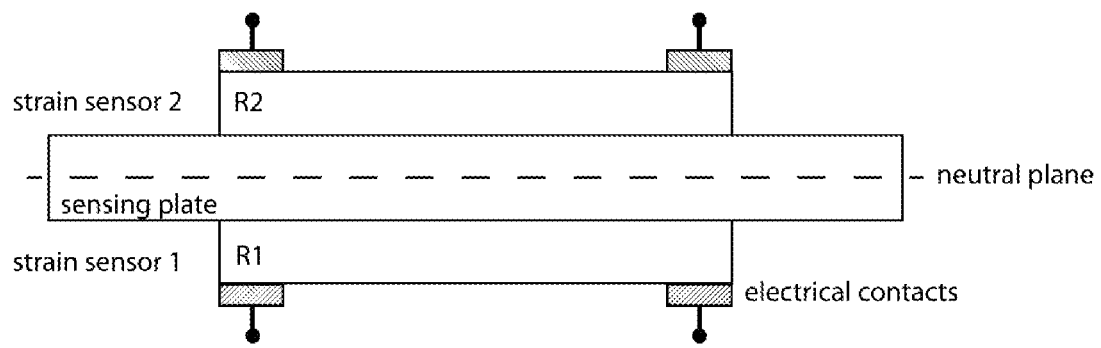
FIG. 4a shows an exemplary structure of the presently disclose sensor structure with at least one sensor on each side of substrate.

The first exemplary illustrative non-limiting embodiment is shown in FIG. 4a, where two piezo-resistive strain sensors, strain Sensor 1 and strain Sensor 2 are deposited opposite to each other on the two surfaces of a sensing plate. Sensor 1 and Sensor 2 may be identical in size and thickness. The sensing plate is thin compared to its length and/or width, and the maximum deflection of the sensing plate experienced during the operation is small so that Kirchoff's Classical Plate Theory (KCPT) applies and the only strain in the system is in-plane strain and out-of-plane shear strain can be neglected. Also, the thickness of the sensing plate may be much larger, preferably at least ten times larger than the combined thickness of the strain sensors and their respective support or adhesive layers, or preferably at least five times larger than the combined thickness of the strain sensors and their respective support or adhesive layers, or preferably at least three times larger than the combined thickness of the strain sensors and their respective support or adhesive layers. Therefore, the presence of the strain sensors and their respective support or adhesive layers does not significantly shift the neutral plane of the sensing plate, nor change the mechanical properties of the system. The bonding strength of both sensors to the sensing plate are assumed to be the same therefor the strain experienced by the sensing plate is transferred to the two sensors with same efficiency, also assuming the strain levels the sensing plate experiences is small and the bonding strength of the sensors to the beam do not change during operation. The gauge factors, GF, of the two sensors are assumed to be the same. The Temperature Coefficient of Resistance (TCR) of the two sensors are also assumed to be the same.

The material of said sensing plate is elastic within the stress level during the operation, that is, it does not undergo irreversible plastic deformation during the operation. Also, said sensing plate may be mechanically supported at the corners, on the peripheral, or by a grid with regular or irregular patterns, so that when an external force is applied to the sensing plate, it may result in local deformation and strain that can be detected by the two strain sensors. Said support may be provided by a frame, a panel, or any practical structures.

Figure 4B:
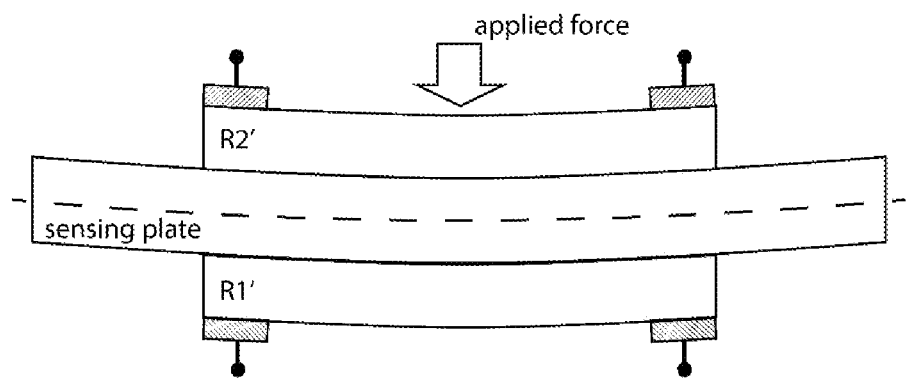
FIG. 4b shows an exemplary structure of the presently disclose sensor structure under normal pressure.

The two strain sensors have initial resistances of $R_{10}$ and $R_{11}$ at the initial temperature $T_0$ with no external force applied. When an external force is applied to the sensing plate, as shown in FIG. 4b, causing tensile or compressive strain, because of the symmetric configuration of this structure, the strain, $\varepsilon$, experienced by the two sensors are equal in magnitude and opposite in sign, especially if the geometry of the strain sensor is much smaller than the curvature of the defamation caused by said external force. If, at the same time, the temperature, $T_0$, of the environment near the sensing beam has also changed to $T_1$, either due to electrical current flow through the sensors or nearby circuits, or the heat from the applicator of the external force, i.e., a finger, the changes of resistances in the two sensors are composed of three components, the response to external stress, the response to thermal stress, and the response to temperature change. It is assumed that both the external force and temperature change are small so that the latter two responses can be treated separately. Also, with modern electronic technology, the entire sensing structure, including the sensing plate and the strain sensors and the supporting structure can be built into miniature scale and the temperature change near the two sensors may be considered identical. A sensing plate with high thermal conductivity, such as a metal beam, may also increase the accuracy of this assumption.

Although for mathematical simplicity, the following equations are derived assuming the supporting plate is a beam, same conclusions can be reached if the supporting plate is a thin plate. The changes of the resistances of the two strain sensors can therefore be expressed as:

$$\frac{\Delta R_1}{R_{10}} = GF(T_1) \times \varepsilon + GF((T_1) \times \varepsilon_T + TCR \times \Delta T \quad \text{Eq. 2}$$

$$\frac{\Delta R_2}{R_{20}} = -GF(T_1) \times \varepsilon + GF(T_1) \times \varepsilon_T + TCR \times \Delta T \quad \text{Eq. 3}$$

Where $\varepsilon_T$ is the thermal induced strain in the sensors, and $\Delta T = T_1 - T_0$. It is obvious that:

$$\frac{\Delta R_1}{R_{10}} - \frac{\Delta R_2}{R_{20}} = 2GF(T_1) \times \varepsilon \quad \text{Eq. 4}$$

$$\frac{\Delta R_1}{R_{10}} + \frac{\Delta R_2}{R_{20}} = 2GF(T_1) \times \varepsilon_T + 2TCR \times \Delta T \quad \text{Eq. 5}$$

So, from the same configuration, the responses to the external force and temperature change may be measured at the same time. The measurement of the strain caused by the external force is straightforward and is usually achieved, but not limited to, by a half or a full Wheatstone bridge.

To measure the temperature accurately, a simple approach is to choose the strain sensor to have a large TCR. Piezo-resistive material, especially those made of the nanocomposite, may be formulated to have a very large TCR, and the response from thermal stress can then be omitted and the temperature change can be extracted with sufficient accuracy. For example, assuming a coefficient of thermal expansion (CTE) difference between the sensing beam and strain sensor is $10^{-5}/°$ C., and the GF of the strain sensor is 10, 1 degree in temperature change will cause a resistance change of 100 ppm. If the TCR of the strain sensor material is tuned to be 1000 ppm/° C., the response from the TCR effect will dominant and the temperature change can be expressed with sufficient accuracy as:

$$\Delta T = \frac{\Delta R / R_0}{TCR} \quad \text{Eq. 5}$$

Here, to simplify the expression, the assumptions are made that $R_0 = R_{10} = R_{20}$ and $\Delta R = \Delta R_1 = \Delta R_2$, but it is obvious that even without these assumptions the temperature change can still be extracted with sufficient accuracy with more complex math and/or a calibration process to determine the initial resistance values and GFs in the optional stress and temperature ranges.

Also, although it is preferable to have a well calibrated and constant TCR throughout the temperature range during the operation. Many applications may tolerate certain uncertainty in the TCR value as long as it has a constant sign in the temperature range during the operation and all the sensors have the same TCR. For example, just to detect a press by a figure does not necessarily require an accurate measurement of the temperature but only needs to detect a sufficiently positive temperature change.

Another approach to minimize the thermal stress is to formulate the piezo-resistive materials to have similar CTE to that of the beam. This is a common approach in conventional strain gauge technology where the metal used in the metal grid is an alloy tailored to have the similar CTE to the material to be measured, i.e. stainless steel. This is particularly useful for nanocomposite piezo-resistive materials since its composition can be modified to match the beam material, especially if the beam material is made of plastic.

To achieve the simultaneous measurement of the strain and temperature, control and signal process circuits may be employed to first establish an electrical configuration incorporating Sensor 1 and Sensor 2, such as but not limited to, a half or full Wheatstone bridge, to perform the operation described in Eq. 4 to extract the measured strain; and then to establish a different electrical configuration incorporating Sensor 1 and Sensor 2, such as but not limited to, a summing amplifier, to perform the operation described in Eq. 5 to extract the measured strain. Since the two operations can be switched electronically, the time lapse between the two measurements may be very short and the two measurements may be considered simultaneous.

The same process may also be achieved with software. One non-limiting example is to provide two current sources to Sensor 1 and Sensor 2 respectively and read the voltages across Sensor 1 and Sensor 2 through an A/D converter into a digital signal processor and then perform the operations described in Eq. 4 and Eq. 5 digitally.

Figure 5A:
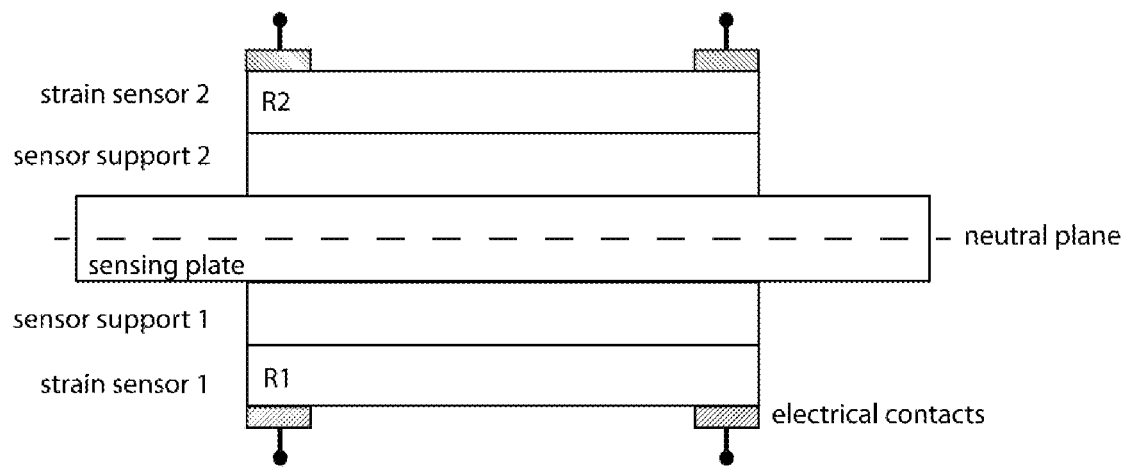
FIG. 5a shows an exemplary structure of the presently disclose sensor structure with supporting layer between the sensor and the substrate. One example of such a supporting layer is an adhesive layer.
Figure 5B:
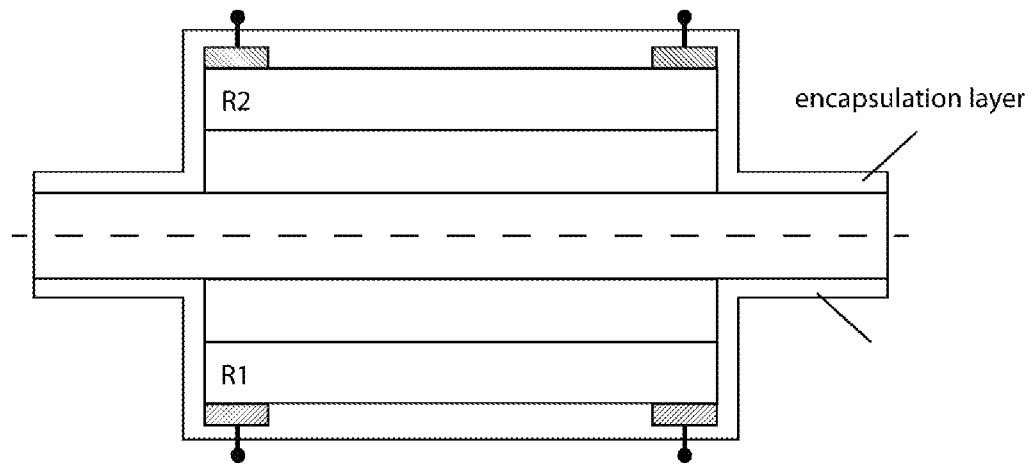
FIG. 5b shows an exemplary structure of the presently disclosed sensor structure with an encapsulation layer.

The sensors may but need not be bonded to the beam directly. For example, as shown in FIG. 5a, supporting structures may be inserted in between the sensors and the beam. They may be an adhesive to provide better bonding; or insulating layer to provide electrical insulation, or any other structure that may improve the sensitivity and accuracy of the measurements. Further, the entire structure may be further encapsulated in a soft protection layer, as shown in FIG. 5b, to provide chemical or electrical protection. The protection layer may be sufficiently soft and thin so it does not significantly impact the mechanical properties of the structure.

Also, as stated earlier, in many cases, the resistivity of the nanocomposite material may change with the presence moisture or other chemical species. A similar dual use strain sensor that measures strain and humidity may be designed based on the same principle.

Figure 6A:
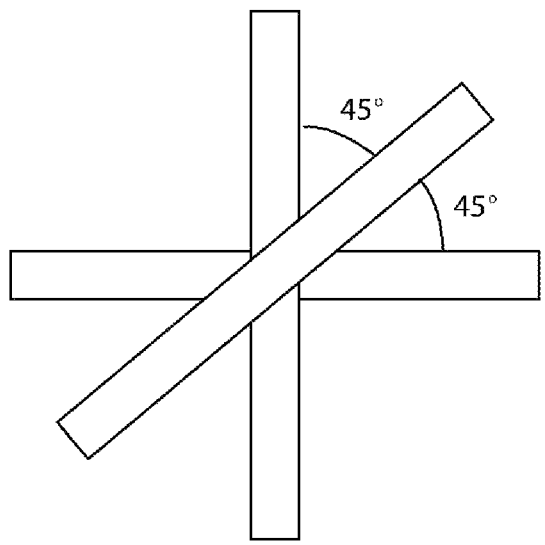
FIG. 6a shows the top view of an exemplary Rosette pattern. Each rectangle represents a presently disclosed sensor pair.
Figure 6B:
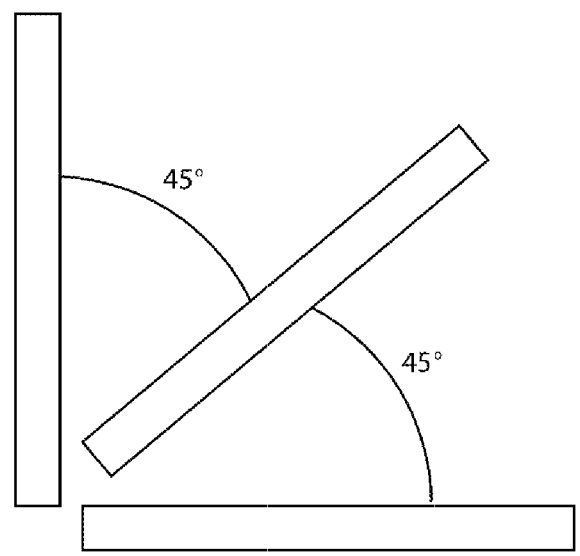
FIG. 6b shows the top view of another exemplary Rosette pattern. Each rectangle represents a presently disclosed sensor pair.

Another exemplary illustrative non-limiting embodiment comprises multiple sensor pairs form a pattern on a sensing plate with each sensor pair oriented at different direction to detect strain at different directions. Such a pattern may provide information of strain at different direction, it may also provide two-dimensional deformation information of the supporting plate. Each sensor pair is deposited directly opposition each other on the two surfaces of the sensing plates. The two sensors of each sensor pair may be identical in size and thickness. At least one sensor pair is used to detect both local strain and temperature. Said pattern may be a Rosette pattern, as shown in FIG. 6a and FIG. 6b, where each bar represents a sensor pair and electrical contacts are made to both ends of the bar.

Another exemplary illustrative non-limiting embodiment is an array of sensor pairs, each sensor pair being deposited directly opposition each other on the two surfaces of the sensing plates. The two sensors of each sensor pair may be identical in size and thickness. The array may be one dimensional, two dimensional, three dimensional, or attached to a complex surface or shape. The sensors in the array may be organized to be individually addressable from an external read-out or control mechanism. By simultaneously detecting strain and temperature, a large amount of information, such as the distribution of strain and temperature and their changes as a function of time, may be extracted.

One example of the exemplary illustrative non-limiting embodiment is an array of sensor pairs placed on a thin soft substrate, which serves as the sensing plate, with necessary, convenient or desirable, electrical connections to connect to an external read-out circuit. The substrate may be wrapped up around a human arm. The simultaneous detection of small pressure changes at different locations on the skin together with local temperature changes may provide information on the person's blood pressure, heart rate, or the pattern of the muscle movements. The correlations between the pressure and temperature signals and the blood pressure, heart rate, or muscle movement may be obtained through extensive data collection over many subjects and under different situations, combined with machine learning. Conversely, the same sensor pair array may be used to control external devices by gesture, as the movement of a certain group of muscles may be translated as a set of skin deformation and local temperature change(s), which will subsequently be detected by said sensor pair array through the read-out circuit to be used to control external devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A dual use sensing structure for detecting strain and temperature comprising:
   a sensing plate having first and second opposing sides,
   a first strain sensor deposited on the first side of the sensing plate, and
   a second strain sensor deposited on the second side of the sensing plate,
   wherein at least one of the first and second strain sensors comprises a conductive filler comprising a nanocomposite that tunes thermal coefficient of resistance, thereby enabling said first and second sensors when electrically connected to external readout circuit to indicate both strain and temperature.

2. The sensing structure of claim 1 wherein the first and second strain sensors each comprise piezo-resistive material including said conductive filler comprising the nanocomposite.

3. The sensing structure of claim 2 wherein said piezo-resistive material comprises composite material comprising at least one polymer binder and at least one conductive filler.

4. The sensing structure of claim 1 wherein the external readout circuit determines changes in resistance of the first and second strain sensors and derives temperature change from the determined changes in resistance.

5. The sensing structure of claim 4 wherein the thermal coefficient of resistance is tuned so that response due to effect of the thermal coefficient of resistance dominates.

6. The sensing structure of claim 1 wherein the first and second strain sensors are structured to have the same tuned thermal coefficient of resistance.

7. The sensing structure of claim 1 wherein the external readout circuit comprises a bridge to produce a strain measurement signal and an amplifier to produce a temperature indication signal that is separate from the strain measurement signal.

8. The sensing structure of claim 7 wherein the external readout circuit further comprises a switch configured to switch the first and second strain sensors between being connected to the bridge and being connected to the amplifier.

9. The sensing structure of claim 1 wherein resistivity of the nancomposite changes with humidity.

10. The sensing structure of claim 1 wherein the first and second strain sensors are arranged on the sensing plate in a rosette pattern.

11. The sensing structure of claim 1 wherein the first and second strain sensors are identical in size and thickness.

12. The sensing structure of claim 1 wherein the sensing structure is configured to be wearable.

13. The sensing structure of claim 1 wherein the sensing structure is configured to detect heat of a finger.

14. The sensing structure of claim 1 wherein the first and second sensors are bonded to the sensor plate.

15. The sensing structure of claim 1 wherein the sensing structure is encapsulated in a soft protection layer.

16. The sensing structure of claim 1 wherein the external readout circuit comprises an analog-to-digital converter.

17. The sensing structure of claim 1 wherein the thermal coefficient of resistance is tuned to be ten times the response to temperature changes.

18. The sensing structure of claim 1 wherein the first and second strain sensors have the same gauge factor.

19. The sensing structure of claim 1 wherein the nanocomposite tunes the rate of change of conductivity with temperature.

20. The sensing structure of claim 1 wherein the first and second strain sensors are arranged on the sensor plate so that the strain on the first and second strain sensors are in opposite directions.

* * * * *